US008689572B2

(12) United States Patent
Evans et al.

(10) Patent No.: US 8,689,572 B2
(45) Date of Patent: *Apr. 8, 2014

(54) CLIMATE CONTROL SYSTEM INCLUDING RESPONSIVE CONTROLLERS

(75) Inventors: Edward B. Evans, St. Louis, MO (US); William P. Butler, St. Louis, MO (US); Steven L. Carey, St. Louis, MO (US); John R. Sartain, St. Louis, MO (US); Ron Miles, St. Louis, MO (US); Donald E. Donnelly, Fenton, MO (US); Swapna Subhash Baviskar, Maharashtra (IN)

(73) Assignee: Emerson Electric Co., St. Louis, MO (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/931,749

(22) Filed: Oct. 31, 2007

(65) Prior Publication Data

US 2008/0054082 A1 Mar. 6, 2008

Related U.S. Application Data

(63) Continuation-in-part of application No. 11/843,380, filed on Aug. 22, 2007, now Pat. No. 7,731,098, which is a continuation of application No. 11/023,744, filed on Dec. 22, 2004, now Pat. No. 7,261,243.

(51) Int. Cl.
F25B 49/00 (2006.01)
G01K 13/00 (2006.01)
F25B 29/00 (2006.01)

(52) U.S. Cl.
USPC ............................. 62/126; 62/129; 165/241

(58) Field of Classification Search
USPC ................... 62/126, 127, 129; 700/278, 276; 702/183
See application file for complete search history.

(56) References Cited

U.S. PATENT DOCUMENTS

| | | | | |
|---|---|---|---|---|
| 3,318,372 A | * | 5/1967 | Shell | 165/240 |
| 4,147,203 A | | 4/1979 | Rayfield | 165/241 |
| 4,262,736 A | * | 4/1981 | Gilkeson et al. | 165/11.1 |
| 4,307,775 A | * | 12/1981 | Saunders et al. | 165/11.1 |
| 4,616,325 A | * | 10/1986 | Heckenbach et al. | 700/276 |
| 5,005,365 A | * | 4/1991 | Lynch | 62/126 |
| 5,022,050 A | | 6/1991 | Tanaka | 375/219 |
| 5,186,386 A | | 2/1993 | Lynch | 236/11 |
| 5,259,445 A | | 11/1993 | Pratt et al. | 165/241 |

(Continued)

OTHER PUBLICATIONS

India Patent Office First Examination Report for co-pending Indian Patent Application No. 1868/MUM/2007 dated Apr. 30, 2012; 3 pgs.

(Continued)

Primary Examiner — Chen Wen Jiang
(74) Attorney, Agent, or Firm — Harness, Dickey & Pierce, P.L.C.

(57) ABSTRACT

A thermostat is provided that receives one or more inputs from at least one heating system of a climate control system, and initiates an appropriate action in response to the input. The thermostat can turn off a heat pump providing substandard heat and responsively turn on a fuel-fired auxiliary furnace. The thermostat may discontinue further operation of the auxiliary furnace upon receiving an operating error signal associated with the auxiliary furnace, and responsively turn on the heat pump to provide for continued heating. The thermostat may also discontinue operation of the fuel-fired furnace and turn on a circulating fan in response to an input signal indicating a furnace high-temperature or a carbon monoxide presence.

4 Claims, 6 Drawing Sheets

(56) References Cited

U.S. PATENT DOCUMENTS

| | | | |
|---|---|---|---|
| 5,405,079 A | 4/1995 | Nealey et al. | 237/2 B |
| 5,628,199 A * | 5/1997 | Hoglund et al. | 62/155 |
| 5,689,963 A * | 11/1997 | Bahel et al. | 62/129 |
| 5,918,668 A * | 7/1999 | Trimble | 165/240 |
| 6,164,374 A * | 12/2000 | Rhodes et al. | 165/240 |
| 6,729,390 B1 | 5/2004 | Toth et al. | |
| 6,874,693 B2 * | 4/2005 | Readio et al. | 237/2 B |
| 7,154,862 B2 * | 12/2006 | Krzyzanowski | 370/254 |
| 7,308,384 B2 | 12/2007 | Shah et al. | |
| 7,731,098 B2 * | 6/2010 | Butler et al. | 236/49.3 |
| 2005/0016191 A1 | 1/2005 | Butler et al. | |
| 2005/0234597 A1 * | 10/2005 | Harrod et al. | 700/276 |
| 2006/0131434 A1 | 6/2006 | Butler et al. | |
| 2006/0185373 A1 | 8/2006 | Butler et al. | |

OTHER PUBLICATIONS

India Patent Application No. 1868/MUM/2007 filed Sep. 24, 2007; 34 pgs.

* cited by examiner

CLIMATE CONTROL SYSTEM INCLUDING RESPONSIVE CONTROLLERS

CROSS-REFERENCE TO RELATED APPLICATIONS

This application is a continuation-in-part of U.S. patent application Ser. No. 11/843,380, filed Aug. 22, 2007, which issued Jun. 8, 2010 as U.S. Pat. No. 7,731,098, which is a continuation of U.S. patent application Ser. No. 11/023,744, entitled "Thermostat Responsive To Inputs From External Devices", filed Dec. 22, 2004, which issued Aug. 28, 2007 as U.S. Pat. No. 7,261,243, the entire disclosures of the above applications are incorporated herein by reference.

FIELD OF THE INVENTION

The present invention relates to thermostats and climate control systems, and in particular, to thermostats and climate control systems associated with a fuel-fired heating system and or a heat pump system.

BACKGROUND

Thermostats are typically used to control climate control systems to maintain the temperature of the space conditioned by the climate control system. A conventional thermostat compares the sensed temperature of the space with a set point temperature and activates the climate control system to heat or cool the space to the desired set point temperature. Some heating systems may comprise a fuel-fired heating system, while others comprise a heat pump and an auxiliary heat system. In the case of a single heating system, the conventional thermostat controls the system by turning on the fuel-fired furnace when there is a demand for heating, and turning on a higher second stage of heating (if present) when there is an increased demand for heating. In the case of a dual heat system, the conventional thermostat controls both systems by turning on the heat pump when there is a demand for heating, and turning on the auxiliary heat system when the heat pump is not adequately providing heating due to low outside temperatures. Such dual heat systems using an auxiliary or supplemental heat system may comprise a fuel-fired furnace. However, present conventional thermostats and climate control systems cannot identify problems with a heat pump or a fuel-fired furnace heating system. In fact, an operating problem in either system may result in an inability to achieve the set point temperature, and a conventional thermostat would only exacerbate the problem by continually requesting operation of the problematic system.

SUMMARY

In accordance with one aspect of the present disclosure, various embodiments of a climate control system including a digital thermostat are provided in which the thermostat receives one or more inputs from at least one heating system of a climate control system, and initiates an appropriate action in response to the input. In one embodiment, a system for controlling the operation of a heat pump and auxiliary heating system is provided that includes a unitary controller for establishing and monitoring the operation of at least a compressor of an outside condenser unit of a heat pump system, and a thermostat. The thermostat is configured to send signals to the unitary controller for requesting operation of at least the compressor, wherein the thermostat is configured to receive signals from the unitary controller indicating that the compressor of the heat pump is inoperable or not operating properly, and to responsively communicate a signal to an auxiliary heating system to initiate auxiliary heating operation, regardless of the outside ambient temperature. In other embodiments, the thermostat is configured to determine whether the heat pump is not operable or operating properly absent any signal from the unitary controller, by detecting a decrease in the temperature of the space that is being heated by the heat pump.

In another aspect of the present disclosure, some embodiments of a system for controlling the operation of a heat pump and auxiliary heating system are provided that include a unitary controller for establishing and monitoring the operation of at least a compressor of an outside condenser unit of a heat pump system, and a thermostat. The thermostat is configured to send signals to the unitary controller for requesting operation of at least the compressor. The unitary controller is configured to determine when the compressor or other heat pump component is inoperable or not operating properly, and to responsively communicate a signal to the auxiliary heating system to initiate auxiliary heating operation during any time period in which the thermostat communicates a request to the unitary controller for heating operation.

DETAILED DESCRIPTION OF THE EMBODIMENTS

Figure 1:
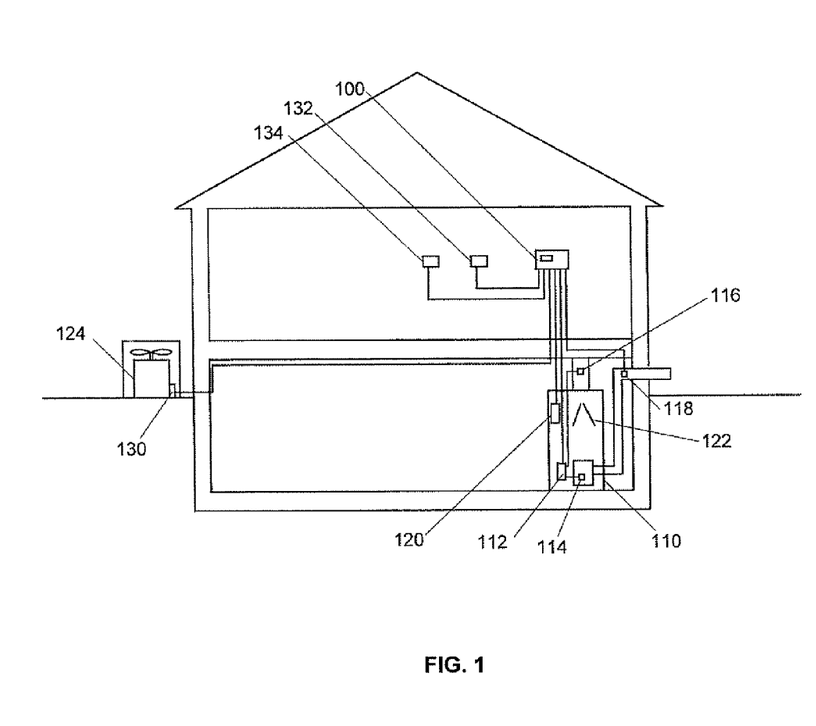
FIG. 1 is an illustration of a climate control system incorporating a thermostat according to the principles of the present disclosure.

A thermostat for controlling a climate control system in which embodiments of the present disclosure can be implemented is indicated generally as 100 in FIG. 1. The climate control system includes at least one heating system, and may be single-stage or multi-stage fuel-fired heating system or a combined heat pump and auxiliary fuel-fired heating furnace 110. Typically, a heat pump comprises an outside unit 124 having a controller 130 and a compressor for compressing a refrigerant that transfers heat to an inside A-coil heat exchanger 122. A thermostat 100 controls the operation of the climate control system via connections to the one or more heating systems. The connections may comprise one or more wires between the thermostat 100 and the heat pump control 120 and fuel-fired furnace control 112, or the connections to the various systems could comprise a RS 485 or a RS-232 communication means, or RF communication or other wireless communication means. In one preferred embodiment, the thermostat 100 comprises an input connection means for RS 485 communication to a processor of the thermostat 100, where the input connection may be connected to a plurality of external devices. The processor of the present invention is generally a microprocessor, and is preferably a 32 Kb memory microprocessor S3C8249Xzz-OWR9 manufactured by Samsung which comprises an RS 485 input port pin.

The communication means in the preferred embodiment comprises a two-wire peer-to-peer network, such as a RS-485 peer-to-peer Local Area Network, but may alternatively comprise any other comparable network suitable such as a RS-232 network for use in a two-way communication arrangement. The RS-485 network is a two-wire, multi-drop network that allows multiple units to share the same two wires in sending and receiving information. The two-wire network connects to the processor of the thermostat and to each controller in the HVAC system, such as the heat pump controller or an auxiliary heating system controller. The thermostat and controllers are always enabled in the receiver mode, monitoring the network for information. Only one transmitter can communicate or occupy the network at a time, so each individual controller is configured to transmit at a fixed time period after the last transmission, where each controller has a fixed time period that is unique to that controller. Thus, after one controller completes its transmission, another controller will wait for the prescribed time period before transmitting its information. In this manner, collisions of data transmission from different controllers may be avoided. The transmissions may also include leader information at the beginning of each transmission, which identifies the controller that the transmission pertains to.

In response to an error input signal from the heat pump control 120 or furnace control 112 or other device external to the thermostat, the thermostat 100 can respond in one or more ways, including (1) displaying information associated with the input signal on a display of the thermostat 100, (2) discontinuing further second stage operation of the furnace, (3) discontinuing the call for heating and turning on the circulation blower fan, (4) discontinuing all further operation of the furnace, (5) discontinuing operation of the heat pump, if applicable, and initiating operation of the fuel-fired furnace, and (6) discontinuing operation of the fuel-fired furnace and initiating operation of the heat pump only, if applicable. In response to receiving an input signal from a fuel-fired furnace control 112 indicating a high temperature condition in the furnace heat exchanger, the processor of the thermostat 100 may discontinue heating operation of the fuel-fired furnace and turn on a circulation blower fan of the furnace until the high temperature condition ends. In response to receiving an input signal from a fuel-fired furnace control 112 of an error from a circulation air pressure switch, the thermostat 100 may indicate on the display of the thermostat a request to check or replace the air filter. In response to an input signal from a fuel-fired furnace control 112 indicating a lock-out of second stage heating, the processor of the thermostat 100 may discontinue further calls for second stage heating and only call for normal heating. In response to an input signal from a furnace control 112 indicating the furnace is locked-out due to repeated ignition failure or flame sense failure, the thermostat 100 may discontinue further calls for operation of the furnace and, if available, call for operation of a heat pump. Likewise, in response to an input signal from a heat pump control 120 indicating the heat pump compressor is inoperable due to locked-rotor or other failure, the thermostat 100 may discontinue further calls for operation of the heat pump and, if available, call for operation of an auxiliary fuel-fired furnace.

In the preferred embodiment of a thermostat incorporating the principles of the present invention, the thermostat is intended for use with one or more heating systems, and can receive one or more inputs from at least one heating system and initiate an appropriate action corresponding to the input. Where the thermostat is used in a dual heat system, the thermostat 100 can turn off a heat pump that is providing substandard heat as a result of near freezing outside temperatures and call for operation of an auxiliary or supplemental heating system. The auxiliary heating system may be of the fuel-fired furnace type having a furnace control 112. If after the thermostat 100 calls for operation of the auxiliary fuel-fired furnace the thermostat 100 receives an input signal indicating the fuel-fired furnace is locked-out or not operating, the thermostat may discontinue the call for operation of the auxiliary fuel-fired furnace and call for heat pump operation only to maintain a supply of heating for the space. Where the auxiliary fuel-fired furnace is not capable of providing an operating fault input to the thermostat, the thermostat 100 is configured to sense a decrease in temperature of the space during operation of the fuel-fired furnace. If after the thermostat 100 calls for operation of the auxiliary fuel-fired furnace the temperature of the space decreases more than a predetermined amount, the thermostat 100 may discontinue the call for operation of the auxiliary fuel-fired furnace and call for heat pump operation only.

Where the outside unit 124 with a compressor is a heat pump, a controller 130 may also be provided that is configured to communicate to the thermostat 100 or other devices. The controller 130 may be a unitary control capable of receiving signals from the thermostat 100, and establishing and monitoring operation of the compressor in the outside unit 124. In such a heat pump system, the thermostat 100 is configured to receive signals from the unitary controller 130 indicating that the compressor or other component of the heat pump is inoperable or not operating properly, in response to which the thermostat 100 would signal the auxiliary heating system to initiate auxiliary heating operation irrespective of any outside ambient temperature sensor information indicating that the outside ambient temperature is warm or above a balance point. For example, the unitary controller is preferably in communication with a discharge temperature sensor and a compressor motor current sensor. The unitary controller 130 is capable of detecting a compressor discharge temperature or a compressor motor current above a predetermined threshold, and is configured to discontinue compressor operation when a predetermined threshold has been exceeded. The unitary controller 130 would then communicate a signal indicating that the compressor is not operating properly. The thermostat 100 is further configured to discontinue sending signals to the unitary controller 130 upon receiving the signal indicating that the compressor is inoperable or not operating properly, and to responsively communicate a signal to the auxiliary heating system. Thus, whenever the thermostat 100 detects a need for heating operation, the thermostat would then send signals to the auxiliary heating system to initiate heating of the space.

Figure 2:
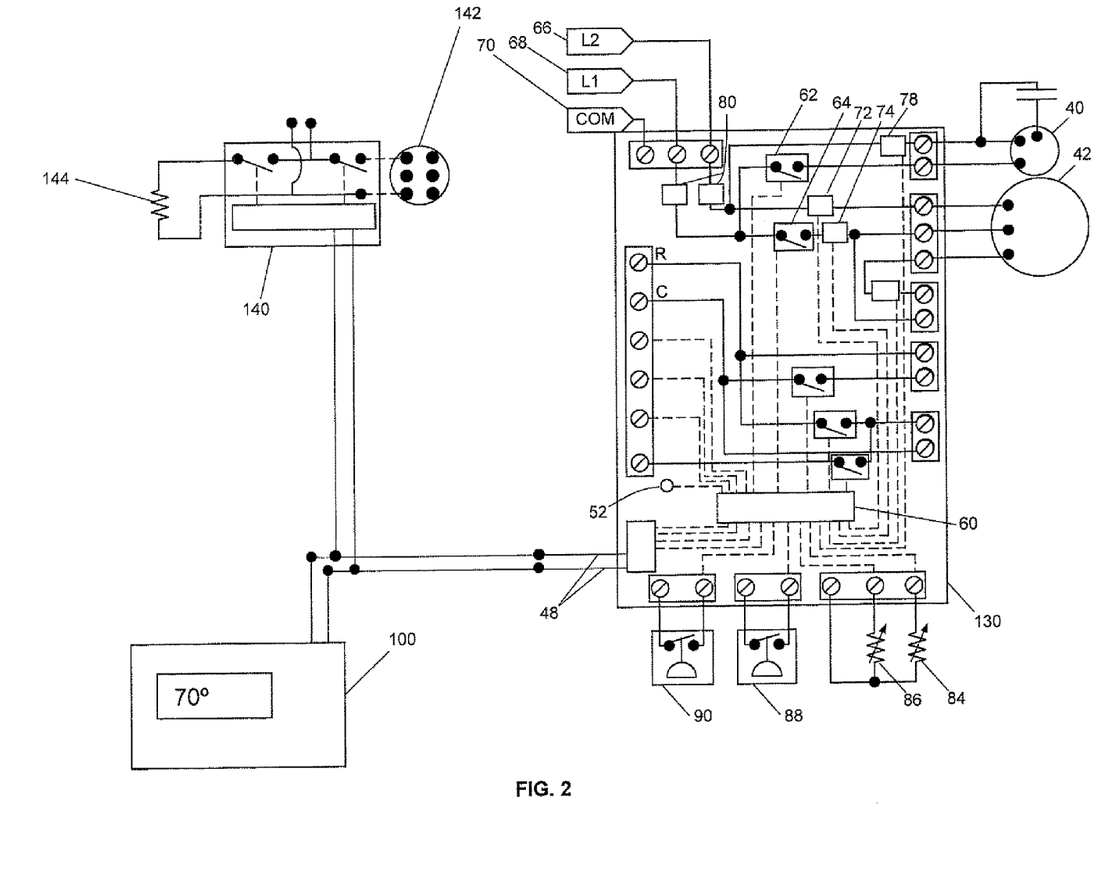
FIG. 2 is a schematic illustration of a unitary controller for a heat pump system in combination with a thermostat and auxiliary heating system.

Similarly, the thermostat 100 may also be configured to determine whether the controller 130 or the heat pump is not operating absent any signal, by detecting, for example, the absence of communication signals from the unitary controller 130, or a drop in the temperature of the space that is being heated by the heat pump, for example. The thermostat 100 is capable of detecting whether the temperature of the space being heated by the heat pump system reflects normal heating operation, whereupon determining a temperature indicative of abnormal heating operation the thermostat 100 responsively communicates a signal to an auxiliary heating system to initiate auxiliary heating operation. The thermostat 100 may initiate or request auxiliary heating operation in response to detecting after a predetermined time period the absence of any increase in the temperature of the space being heated by the heat pump system. Alternatively, the thermostat 100 may request auxiliary heating operation in response to determining after a predetermined time period of operation that a decrease has occurred in the temperature of the space being heated by the heat pump system (such as any temperature decrease over a ten minute period), or in response to detecting a decrease of more than a predetermined amount, (such as 3 degrees, for example). The thermostat 100 would accordingly signal the auxiliary heating system to initiate auxiliary heating operation, even where the outside ambient temperature is warm or above a balance point. Additionally, the unitary control 130 may also be configured to determine when the heat pump system is not operable, and to communicate or signal the auxiliary heating system to initiate auxiliary heating operation, during any time period or duration in which the thermostat 100 communicates a request to the unitary controller 130 for heating operation. Referring to FIG. 2, the auxiliary heating system may be an electric heat source such as an electric strip resistance element 144 associated with or disposed within an indoor air circulator unit, which has a controller 140 for operating a blower motor 142 and for selectively operating the auxiliary electrical heating elements 144 upon receiving a signal from the unitary controller 130 to initiate heating. Alternatively, it should be noted that the auxiliary heating system may be a fuel-fired heating system having a furnace controller (not shown) that the unitary controller communicates a signal to for requesting auxiliary heating operation.

One example of an outdoor controller 130 is disclosed in U.S. patent application Ser. No. 11/063,806, entitled "Interactive Control System For An HVAC System", filed Feb. 23, 2005, which issued Oct. 20, 2007 as U.S. Pat. No. 7,296,426, which is incorporated herein by reference. As shown in FIG. 2, the outdoor unit controller 130 may comprise a microprocessor 60 and a plurality of switching means 62 and 64 for controlling the switching of line voltage 66, 68, and 70 to the compressor motor 42 and to the condenser fan motor 40. The switching means preferably are relays 62 and 64 each having first and second contacts, at least one of which may be in communication with the processor 60. This enables the processor 60 to sense voltage or current across the at least one contact to the compressor motor 42, for example. Thus, the processor 60 has the capability of determining whether the current to the compressor motor 42 exceeds a predetermined threshold, for example. The outdoor unit controller 130 also receives input from a plurality of remote sensors 72 through 90 for monitoring operating parameters of the outdoor unit components. These sensors may include current sensors 72, and 74 for sensing the current level in the start winding and run winding of the compressor motor 42, and a sensor 78 for sensing the current in the condenser fan motor 40. Other sensors may include a sensor 80 for sensing the magnitude of the line voltage to the motors, a temperature sensor 82 for sensing the temperature of the condenser coil, a temperature sensor 84 for sensing the outside ambient temperature, and a temperature sensor 86 for sensing the compressor's refrigerant Discharge Line Temperature. Pressure sensors 88 and 90 may also monitor the pressure of the refrigerant at the inlet and outlet of the compressor in unit 124. The outdoor unit controller 130 is configured to provide diagnostic information or codes based on the current values obtained from the current sensors 72, 74 and 78 for monitoring the current in the condenser fan motor 40 and the compressor motor 42. This current sensing may provide diagnostic information or fault codes such as a repeated motor protector trip fault, welded contacts in the switching relays 62 and 64, an open start winding circuit, an open run winding circuit, or a locked rotor current fault. The outdoor unit controller may communicate these failures via a network connection 48 to a two-wire network in communication with the thermostat 100, or to an LED 52, for example.

The unitary control 130 may also be configured to determine when the outside ambient temperature is below a balance point, and to communicate or signal the auxiliary heating system to initiate auxiliary heating operation, during any time period or duration in which the thermostat 100 communicates a request to the controller 130 for heating operation. In yet another aspect, the heat exchange coils of the outside unit of a heat pump typically collect ice. This ice has to be melted periodically, so the unitary controller 130 switches the heat pump to the air conditioning mode to extract heat from the home or space to melt the ice, even though there is call for heat from the thermostat 100. To avoid discomfort to the user caused by cold air in the house in the air conditioning or defrost mode, the unitary control sends a command to switch on the auxiliary source of heating. The auxiliary heat furnace provides a source of supplemental heating during the defrost cycle. In this manner, the thermostat 100 may communicate a request for heating operation by the heat pump, and the controller 130 may responsively determine when the heat pump system or auxiliary heat system should be employed, independent of the thermostat 100.

It should be noted that each of the thermostat, unitary controller, or other controllers may be connected to the two wire network, where the unitary controller is configured to transmit signals after the last transmission and a fixed time period that is unique to the unitary controller, and the thermostat is configured to transmit signals after the last transmission and a fixed time period that is unique to the thermostat. In this manner, the possibility of collision of signals transmitted via the network may be avoided.

In the preferred embodiment, the thermostat 100 may also be connected to other devices external to the thermostat associated with the climate control system, including a furnace flue pressure sensor, a carbon monoxide sensor and a smoke detector. The thermostat 100 may receive an input signal from a flue pressure sensor indicating the flue of a fuel-fired furnace is blocked, and respond by discontinuing further operation of the fuel-fired furnace to prevent combustion air in the flue from accumulating in the space. The thermostat 100 may similarly receive an input signal from a smoke detector indicating the presence of smoke in the space, and respond by discontinuing further operation of the fuel-fired furnace. The thermostat 100 may also receive an input signal from a carbon monoxide sensor indicating the presence of carbon monoxide, and respond by discontinuing further operation of the fuel-fired furnace and turning on the circulation blower fan. In a dual heating climate control system, the thermostat 100 may also call for operation of a heat pump if available after discontinuing operation of the fuel-fired furnace. It should be appreciated that in the preferred embodiment the thermostat may be configured to provide an appropriate response to any number of input signals from one or more apparatus in a climate control system.

The thermostat 100 may be configured to include an RS 485 or an RS 232 connection for receiving input signals from a plurality of external devices, and a monitoring means for analyzing and identifying the source of the input signal. The monitoring means enables the processor of the thermostat 100 to determine which system or apparatus the input signal corresponds to, for initiating an appropriate action in response to the information received through the RS 485 connection to the thermostat 100. Thus, the thermostat 100 implementing the present invention can respond to informational and error input signals, in various ways comprising the display of information associated with the input signal on a display of the thermostat, and the control of one or more heating apparatus in a climate control system.

It should be noted that the thermostat display may be used to display a description of the information received in the input signal and the time of the signal, for the purpose of trouble-shooting the climate control system. The information may also be communicated through other display means such as an LED that is flashed on and off to provide an optical signal that may be read by the user of the thermostat or by a flashing Light Emitting Diode (LED) used by a technician. Likewise, the inventive thermostat may be configured to be used with other apparatus not included in the preceding embodiment, such as an air conditioner of a climate control system.

Figure 3:
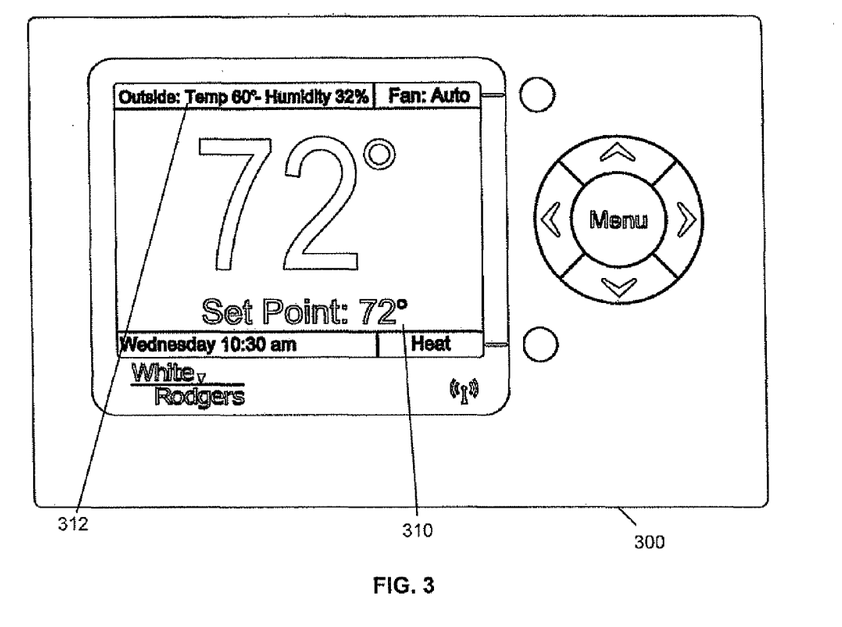
FIG. 3 is an illustration of a thermostat display according to the principles of the present invention.
Figure 4:
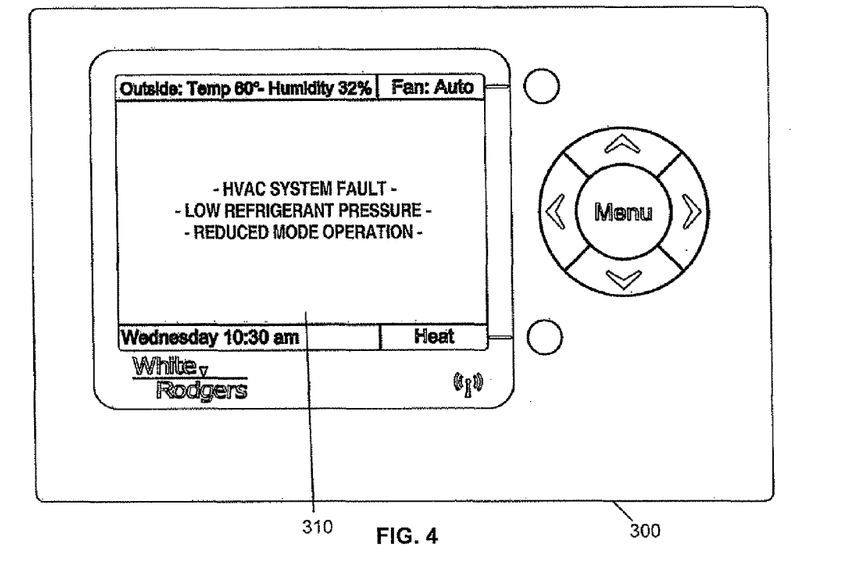
FIG. 4 is an illustration of a thermostat display according to the principles of the present invention.
Figure 5:
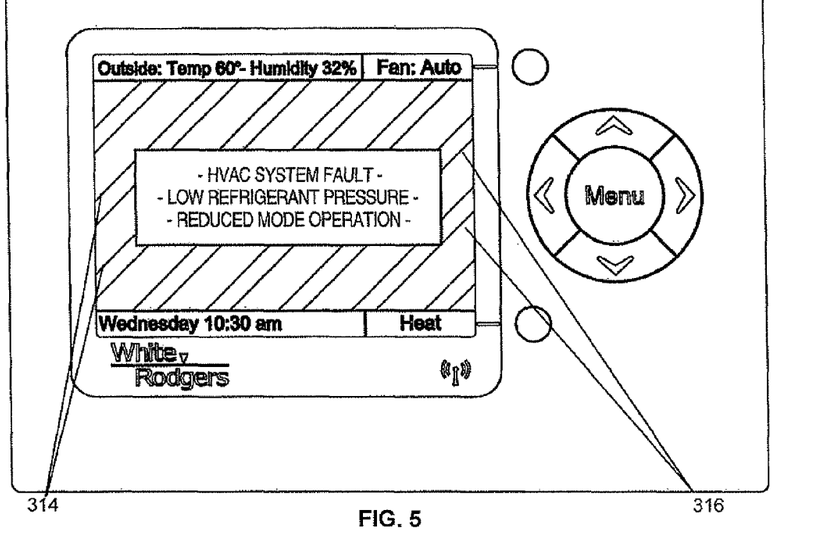
FIG. 5 is an illustration of a thermostat display according to the principles of the present invention.
Figure 6:
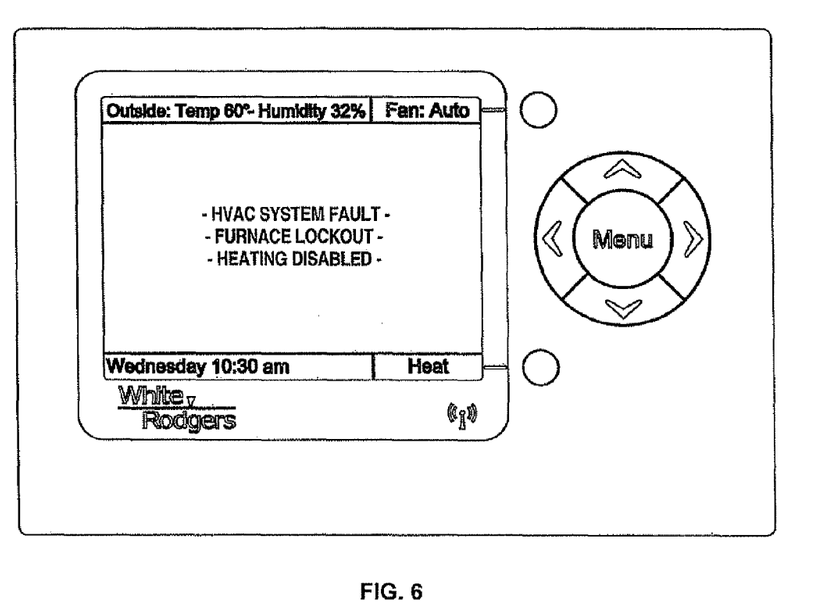
FIG. 6 is an illustration of a thermostat display according to the principles of the present invention.
Figure 7:
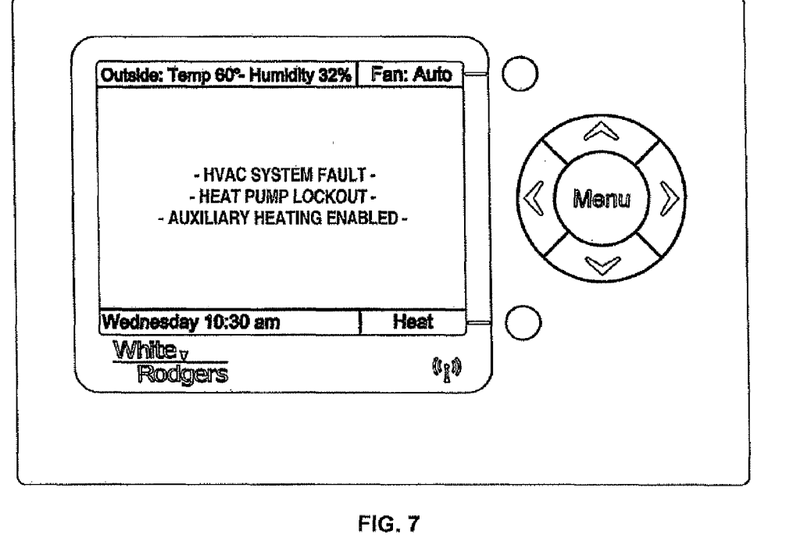
FIG. 7 is an illustration of a thermostat display according to the principles of the present invention.

Referring to FIGS. 3 through 7, another embodiment of a thermostat according to the principles of the present invention is shown at 300. The thermostat 300 includes a display device 310, and is preferably configured to communicate with one or more external devices. In response to a signal received from the heat pump controller, furnace controller, indoor blower controller, or other device external to the thermostat, the thermostat can respond in one or more ways including displaying information associated with the input signal on the display 310. For example, the thermostat may receive an input signal from an outdoor temperature sensor external to the thermostat, and display the outdoor temperature information as shown in FIG. 3. Referring to FIG. 4, the thermostat may receive an input signal from the heat pump or unitary control indicating the presence of a low refrigerant charge pressure, and display the received information associated with the signal, of a low refrigerant charge and a reduced mode of operation. The display device preferably has a color display and may, for example, be configured to display a red background 312, such as when the thermostat is in the heat mode. Similarly, the thermostat may be configured to display a blue background when in the cooling mode. Referring to FIG. 5, the thermostat display device may further be configured to display a message against a background having contrasting colors for alerting an occupant of the information being displayed. The display device may be a color display, for example, that is configured to display a number of black stripes 314 and yellow stripes 316 for the purpose of capturing the attention of an occupant to indicate a warning, such as the presence of an elevated carbon monoxide level. Similarly, the thermostat may receive an input signal from a fuel-fired furnace control 112 indicating a lock-out of the furnace as explained above, where the thermostat responsively displays the received information associated with the signal, of a furnace lockout and heating disabled as shown in FIG. 6. The thermostat may receive an input signal from a heat pump or unitary controller 130 indicating that the heat pump is locked-out, where the thermostat responsively displays the received information associated with the signal of a heat pump lockout, as shown in FIG. 7. The thermostat may also display any HVAC operation action initiated by the thermostat in response to the received signal, such as "auxiliary heating enabled" as in FIG. 7. Where the thermostat display device 310 is a color display device, or includes a multiple color display light, the thermostat may also be selectively configured to display a desired background color or display light color of the user's choice.

Figure 8:
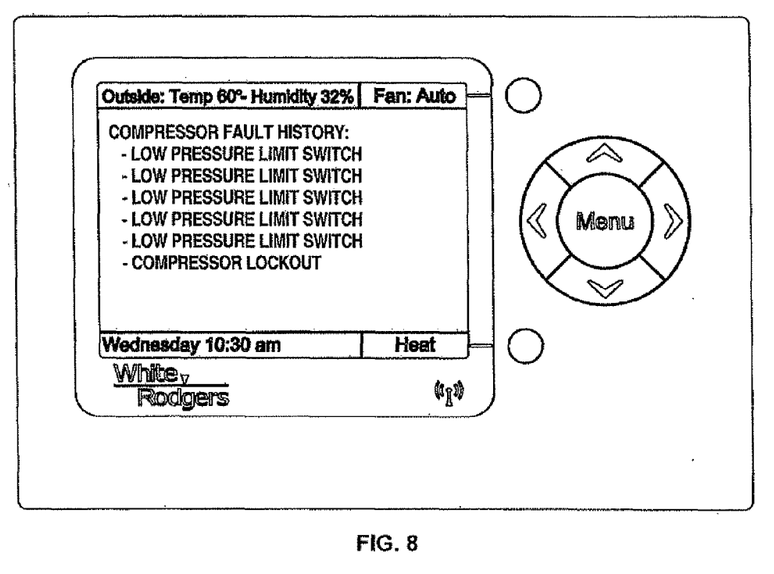
FIG. 8 is an illustration of a thermostat display according to the principles of the present invention.
Figure 9:
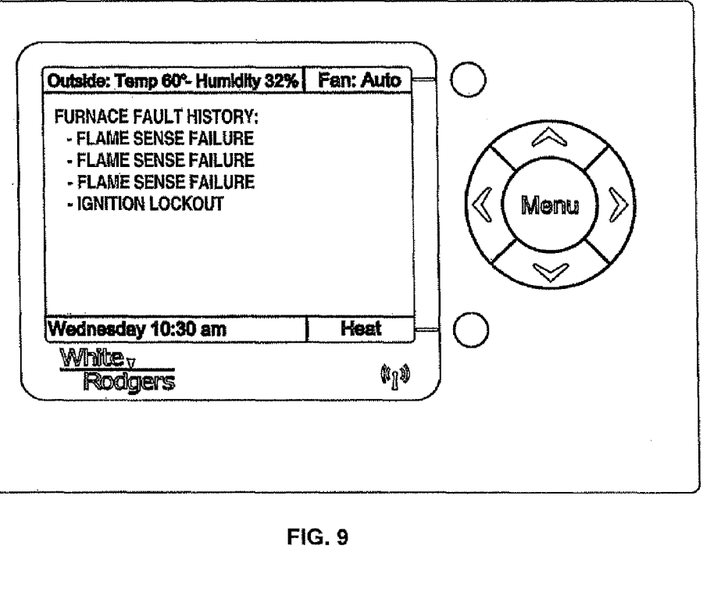
FIG. 9 is an illustration of a thermostat display according to the principles of the present invention.
Figure 10:
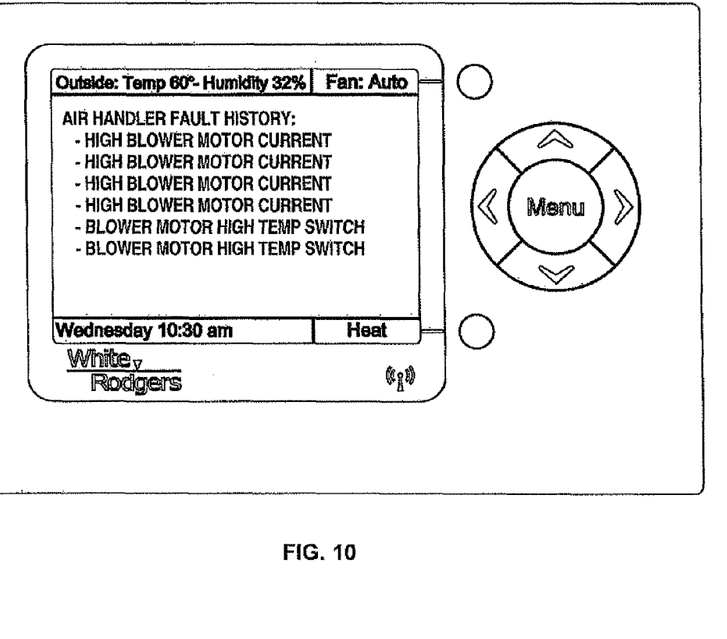
FIG. 10 is an illustration of a thermostat display according to the principles of the present invention.

Referring to FIGS. 8 through 10, the thermostat 300 may be further configured to display a history of fault information signals communicated to the thermostat. The thermostat may be configurable to automatically display the history without prompting, but is preferably set to display a history of fault information upon prompting by a user of the thermostat. Specifically, once the thermostat receives and displays an HVAC system fault, the thermostat may be prompted by a user or technician, or by a user-selected setting of the thermostat's program, to request a history of fault information from a particular controller within the HVAC system. The prompted controller, such as a heat pump controller for example, is configured to respond by recalling one or more faults stored in a memory of the controller, and to transmitting one or more signals of a number of HVAC faults, including a low pressure limit switch fault or low refrigerant pressure fault. In this manner, the occupant or a service technician may request the thermostat to display all signal information communicated from the heat pump or unitary controller 130, which may include a list of low pressure limit switch faults followed by a lockout of the compressor, as shown in FIG. 8 for example. Similarly, a service technician may request the thermostat to display all signal information communicated from the fuel-fired furnace control 112, which may include a list of flame sense failure faults followed by an ignition lockout of the furnace, as shown in FIG. 9 for example. The thermostat may also be configured to display signal information communicated from an indoor blower unit, which may include a list of high blower motor current faults or high temperature switch faults, as shown in FIG. 10 for example.

Additional design considerations, readily apparent to one of ordinary skill in the art, such as the modification of the thermostat to display on the LCD display error or fault information communicated from the unitary controller may also improve the user's ability to correct a problem in the climate control system. It should be apparent to those skilled in the art that various modifications such as the above may be made without departing from the spirit and scope of the invention. More particularly, the apparatus may be adapted to any apparatus for controlling a climate control system. Accordingly, it is not intended that the invention be limited by the particular form illustrated and described above, but by the appended claims.

What is claimed is:

1. A climate control system comprising:
    a heat pump system including an outside unit having a compressor;
    an auxiliary heating system having a control capable of digital communication;
    a thermostat coupled to the heat pump system and the auxiliary heating system, the thermostat configured as a peer in a peer-to-peer network that includes as peers the control and a controller coupled to the heat pump system, the controller configured to determine when an outside ambient temperature is below a predetermined temperature value and to communicate a request via the peer-to-peer network to the auxiliary heating system control to initiate an auxiliary heating operation when the thermostat communicates a request to the controller for heating operation;
    wherein the controller is configured to request the control for operation of the auxiliary heating system, when the compressor of the heat pump system is determined to be inoperable and/or the heat pump system is in a defrosting mode, and there is a demand for heat.

2. The climate control system of claim 1, wherein the outside unit comprises the controller.

3. The climate control system of claim 1, wherein the thermostat comprises a lighted display on which one or more fault messages from the controller and/or from any other controls and/or controllers of the climate control system are displayable in relation to one or more colors based on a current mode of the climate control system.

4. The climate control system of claim 1, wherein the thermostat uses a decrease detected in the temperature of the space that is being heated by the heat pump system to determine whether the heat pump system is operable or inoperable.

* * * * *